(12) United States Patent
Steinrück et al.

(10) Patent No.: US 6,182,943 B1
(45) Date of Patent: Feb. 6, 2001

(54) GAS VALVE WITH ELECTROMAGNETIC ACTUATION

(75) Inventors: Peter Steinrück, Hallstadt; Karl Rein, Vienna; Josef Horvath, Nebersdorf, all of (AT)

(73) Assignee: Hoerbiger Ventilwerke GmbH, Vienna (AT)

(*) Notice: Under 35 U.S.C. 154(b), the term of this patent shall be extended for 0 days.

(21) Appl. No.: 09/256,760

(22) Filed: Feb. 24, 1999

(30) Foreign Application Priority Data

Feb. 24, 1998 (AT) ........................................ 333/98
Feb. 24, 1998 (AT) ........................................ 336/98
Mar. 11, 1998 (AT) ........................................ 438/98

(51) Int. Cl.⁷ ............................. F16K 31/08; F02M 61/04
(52) U.S. Cl. ................................ 251/129.16; 251/129.15; 251/359; 239/585.3
(58) Field of Search ........................... 251/359, 129.15, 251/129.16; 239/585.1, 585.3, 585.4, 553, 553.3, 553.5

(56) References Cited

U.S. PATENT DOCUMENTS

| | | | |
|---|---|---|---|
| 2,325,878 | * 8/1943 | Ray | 251/129.15 X |
| 4,056,255 | * 11/1977 | Lace | 251/129.15 |
| 4,783,044 | * 11/1988 | Ellison | 251/129.15 X |
| 5,060,868 | * 10/1991 | Knapp et al. | 239/585.3 |
| 5,080,288 | * 1/1992 | Shen | 251/129.15 X |
| 5,284,317 | * 2/1994 | Brehm et al. | 251/129.15 X |
| 5,372,313 | * 12/1994 | Chabon et al. | 239/585.3 |
| 5,381,965 | * 1/1995 | Chabon et al. | 239/585.1 |
| 5,398,724 | 3/1995 | Vars et al. | 137/625.33 |
| 5,542,610 | * 8/1996 | Augustin | 239/533.8 |
| 5,560,585 | * 10/1996 | Krimmer et al. | 251/129.21 |
| 5,645,226 | * 7/1997 | Bright | 239/585.1 |
| 5,678,769 | * 10/1997 | Jacobs | 239/585.1 |
| 5,806,766 | * 9/1998 | Krueger et al. | 239/96 |
| 5,823,444 | * 10/1998 | Reiter et al. | 239/533.12 |
| 5,860,597 | * 1/1999 | Tarr | 239/124 |
| 5,934,559 | * 8/1999 | Coldren et al. | 239/88 |

FOREIGN PATENT DOCUMENTS

2144827 * 3/1985 (GB) ................... 239/585.1
2147949 * 5/1985 (GB) ................... 239/585.3

* cited by examiner

Primary Examiner—John Rivell
Assistant Examiner—Meredith H Schoenfeld
(74) Attorney, Agent, or Firm—Dykema Gossett PLLC

(57) ABSTRACT

A gas valve with electromagnetic actuation, in particular for use as a fuel injection valve for gas engines, includes a sealing element (7), actuable by way of an armature (12) of a controllable electromagnet (19), between a or each fuel inlet (4) and a or each fuel outlet (24), and at least one closing spring (8) acting on the sealing element (7). In order to achieve very short switching and response times while at the same time having a large passage cross-section, and thus to render the gas valve suitable also for use in multi-point systems and in supercharged engines, in particular gas engines for commercial vehicles, the gas valve is designed as a flat-seat valve with a plane valve seat (3) and a sealing element (7) with at least one plane sealing surface facing this valve seat.

39 Claims, 5 Drawing Sheets

GAS VALVE WITH ELECTROMAGNETIC ACTUATION

BACKGROUND OF THE INVENTION

1. Field of the Invention

The present invention relates to a gas valve with electromagnetic actuation, in particular to a fuel injection valve for gas engines, which includes a sealing element, actuable by way of an armature of a controllable electromagnet, between a or each fuel inlet and a or each fuel outlet, and at least one closing spring acting on the sealing element.

2. The Prior Art

In conventional gas engines based on the Otto principle, the fuel gas is admixed in the intake port and then supplied to the cylinders. Control valves and static mixers, for example, are used in this procedure. However, these systems are too unwieldy for systems with electronic fuel injection. Gas nozzles switched by way of magnets have therefore been used, these nozzles metering the fuel and producing a combustible mixture in the entire supply system. On account of the fact that the passage cross-sections are too small in conventional gas valves for use in commercial vehicles, it is necessary to bundle these gas valves, typically up to twelve of them, to obtain sufficient cross-sections (corresponding to the central injection which is customary in passenger vehicles). For this reason, gas engines, for example CNG (compressed natural gas), LPG (liquefied petroleum gas) or hydrogen engines, should also only be operated at present without supercharging, that is to say at atmospheric pressure, and typically achieve about 145 kW.

However, for improved controllability, better fuel utilization and more favorable pollutant emissions, preference is given to systems which operate with so-called sequential fuel injection (also known as multi-point injection or ported-gas admission) and supply each cylinder individually with its combustible mixture by way of separate injectors or valves. In this case, it is not necessary for a combustible mixture to be present in the entire intake system and the fuel injection mainly takes place during the intake cycle of the respective cylinder only. However, the valves known at present are unsuitable for use in such systems, since their passage cross-sections of not more than 4 to 5 mm$^2$ are too small, so that, per cylinder, two valves would be needed in atmospheric engines and three valves in supercharged engines. However, this is scarcely possible for structural reasons. On the other hand, the requirement for a larger passage cross-section entails ever-greater difficulties as regards obtaining the required short switching times and the high metering precision necessary, resulting in a low average pressure especially in the idle range and part-load range.

It is an object of the present invention to provide a gas valve which has very short switching and response times and at the same time a large passage cross-section, and which is suitable also for use in multi-point systems or ported-gas-admission systems and in supercharged engines, in particular in gas engines for commercial vehicles. An additional object is therefore to provide lightweight and yet stable sealing elements which combine the necessary rapid mobility, through small electromagnets, with a sure sealing action.

SUMMARY OF THE INVENTION

The invention provides a gas valve with electromagnetic actuation comprising at least one fuel inlet, at least one fuel outlet, a sealing element actuable by way of an armature of a controllable electromagnet and arranged between the or each fuel inlet and the or each fuel outlet, and at least one spring acting on the sealing element, wherein the gas valve is designed as a flat-seat valve with a plane valve seat and a sealing element with at least one plane sealing surface facing this valve seat. This design allows reliable and sure switching of high valve cross-sections of up to 10 mm$^2$ along with very small switching times, so that such a gas valve can be used to obtain the necessary control times of less than 1 ms with high precision, even at idle speed or part load.

According to a preferred feature of the invention, the fuel inlet opens radially into an annular space surrounding the valve seat below the sealing element. This produces good evening-out of the fuel flow upstream of the sealing element of the valve, and the amount of gas admitted is not adversely affected by fluidic phenomena.

A further object is achieved according to the invention with a gas valve with at least one sealing strip in the form of a closed curve, substantially circular, in that the sealing element has a number, proportional to the number of sealing strips, of peripheral ridges which follow the course of the sealing strips and of which at least two in each case are interconnected by at least one radial wall. These spaced-apart ridges cover substantially only the sealing strips and permit, however, the gas access to all these sealing strips. If in this case the passage cross-section is appropriately maximized, however, the material usage, hence the weight, and also the area of action for the differential pressure between the inflow and outflow side are minimized, while at the same time the grid structure of the sealing element provides a strength which sufficiently ensures the sealing action.

A design of high mechanical stability is provided if at least one radial wall, preferably all the radial walls, radiate from the center of the sealing element and interconnect all the peripheral webs.

In order to achieve an optimal compromise between mechanical strength and low weight, according to a preferred feature of the invention the axial height of the radial walls decreases from the center towards the edge of the sealing element.

For connection to an actuating element in a manner which is simple and favorable with regard to the application of the actuating forces, the sealing element preferably has a central bore for receiving an actuating element.

In order to ensure a connection to the actuating element in a manner which is as stable as possible and provide the possibility for coupling to additional components which influence the movement of the sealing element, the central bore is axially extended in the manner of a bush.

Advantageously, the sealing element is made as an injection-moulded part from plastics, preferably from a polymer, thereby ensuring together with a lightweight design also a very extensive reduction of the wear on the valve seat.

According to a further preferred embodiment of the invention, the valve seat is formed by at least two concentric sealing strips which define an annular passage cross-section which is covered by an annular sealing element, and gas passages are provided to both sealing strips, the gas passages to the outer sealing strip being formed by the or each fuel inlet and the annular space, and the gas passages to the inner sealing strip being formed by at least one preferably radial fuel inlet, cutouts in the actuating element, and a central cutout of the annular sealing element. Consequently, two ring areas are available for the fuel gas to flow through, thereby producing an enlargement of the passage cross-section by almost twice for the same switching and control times. Thus, for control times of less than 1 ms, valve cross-sections of around 15 mm² are possible even with only two sealing strips.

In order to take up the forces of the opening and closing system which act on the sealing element in such gas valves and to prevent deformations as a result of these forces acting in different regions of the sealing element, the armature acts on the sealing element by way of the actuating element. This ensures a large-area contact and force application, not giving rise to any deforming torques. However, by virtue of its large area of contact with the sealing element, the actuating element can at the same time also prevent deformation torques due to other system components and thus ensure the sealing action.

Preferably, the or each closing spring acts on the actuating element, preferably on a widened end piece provided for bearing on the sealing element. The closing force of the spring(s) is thereby applied to the sealing element over a large area by way of the plunger and can lead neither to deformations of the sealing element which impair leaktightness nor to concentrated overloading or material damage.

According to a preferred feature of the invention, to ensure the sealing action and the smooth movement of the gas valve, at least one closing spring also urges the sealing element or the actuating element with a centering force, radially in the direction of the center axis of the outlet opening. The sealing element thus always remains in the centered position which provides optimal sealing and its movement also remains smooth by virtue of the fact that chafing or rubbing on a side wall of the valve housing is prevented.

In a very simple and yet functionally reliable design variant a helical spring surrounding the actuating element is provided as the closing spring, the helical spring tapering towards the sealing element or towards the actuating element. Consequently, a single component effects both the closing action and the centring of the sealing element.

If, according to a preferred feature of the invention, at least one opening spring which urges the sealing element in the opening direction is provided, it is possible to obtain a rapid, sure lifting-off of the sealing element from the valve seat substantially independently of pressure conditions in the system, the opening spring optimally assisting the action of the electromagnet. Furthermore, a tension-resistant connection of the sealing element to the actuating arrangement which is often difficult to produce can be avoided, since the lifting-off of the sealing element from the valve seat can be effected by the action of the opening spring. The optimal materials can thus be used for each separate component.

The response and the control times can be equally rapid both for the opening and closing of the valve so as to be able to ensure the required metering precision in the entire speed range, even when idling and at part load. According to a further feature of the invention therefore, there is provision for the difference between the forces of closing spring and opening spring arrangement to be substantially equal, in quantity, to the difference between the forces of the electromagnet and the resultant force of the spring arrangement. This gives rise to equal forces both for the opening and closing and thus also substantially equal control and response times.

Embodiments of the invention will now be described with reference to the accompanying drawings.

DETAILED DESCRIPTION OF THE PREFERRED EMBODIMENTS

Figure 1:
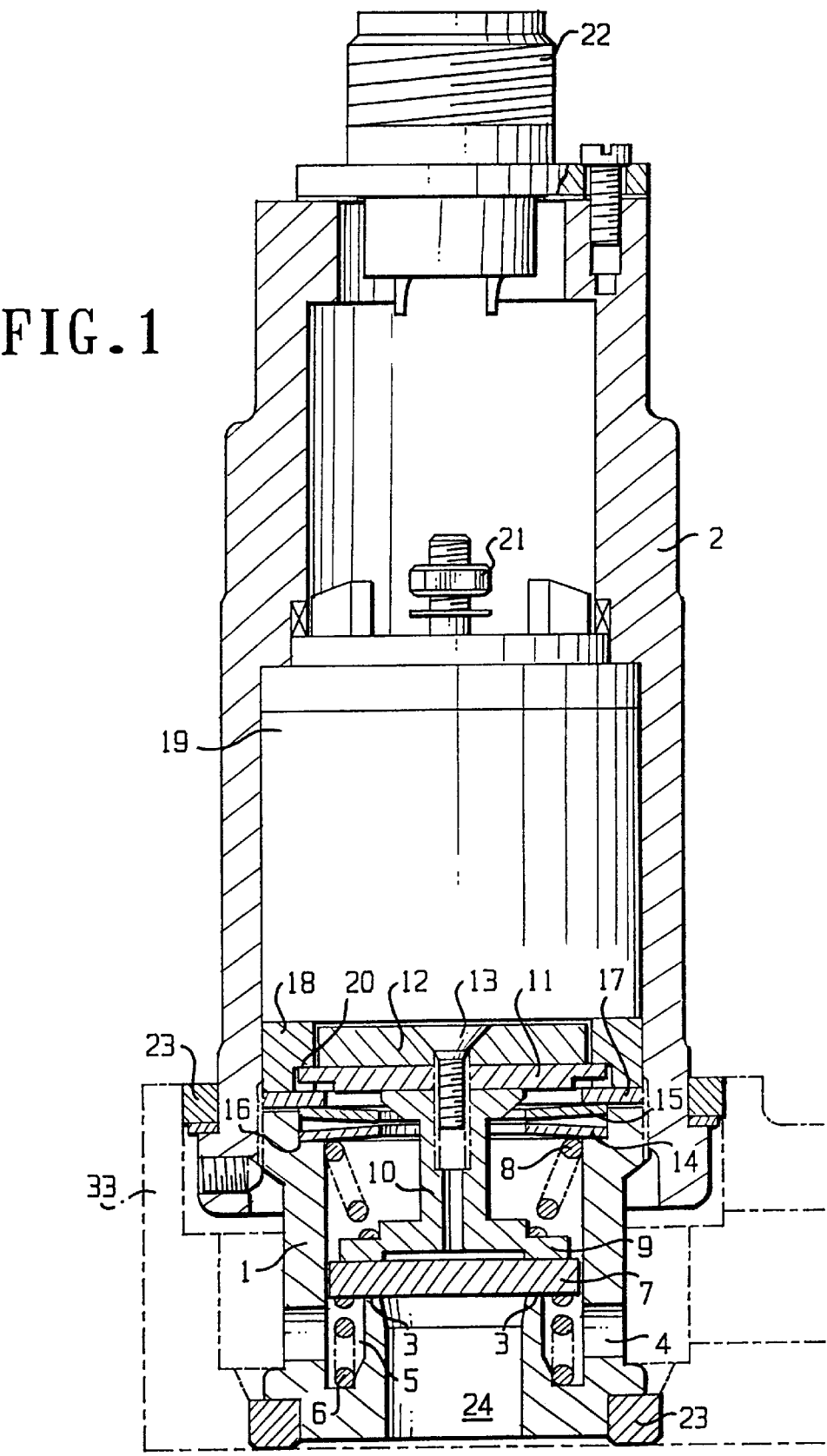
FIG. 1 shows a first preferred embodiment of a gas valve of relatively small valve cross-section, with one sealing strip.

FIG. 1 shows a gas valve including a valve body 1 and a magnetic clamping nut 2 which is screwed onto an external thread of the valve body 1. The valve body 1 contains a valve seat 3, which in this case is a simple plane sealing strip of substantially circular design for relatively small valve cross-sections. The gaseous fuel or the combustible mixture, for example compressed natural gas, liquefied petroleum gas or hydrogen, enters an annular space 5 in the valve body 1 through the preferably radial fuel inlets 4, although other points of entry or directions of entry are also possible. For instance, the gaseous fuel or the combustible mixture could also enter the valve body 1 through at least one axial channel which may, for example, also run through or to the side of the magnetic clamping nut.

At least one opening spring 6, preferably designed as a helical spring, urges the sealing element 7, preferably made from plastic, with a force in the valve-opening direction. The opening spring 6 is also inserted in the annular space 5, which serves to even out the gas flow in order to improve the passage through the valve.

The annular space 5 is preferably arranged below the sealing strip 3 and the sealing element 7, but an evening-out space above these parts is also conceivable. In either case, this space prevents an adverse effect on the flow through the freed valve cross-section due to flow phenomena, so that there is always an optimal flow through the entire opening cross-section and the maximum-possible amount of gas can pass through the valve.

At least one stronger closing spring 8 acts on the sealing element 7 from the opposite side to the opening spring 6. The closing spring 8 is preferably a helical spring which is tapered towards the sealing element 7. However, the closing spring 8 does not act directly on the sealing element 7, but rather on the widened, substantially disc-shaped end part 9 of an actuating element 10. The actuating element 10 is preferably surrounded by the closing spring 8. The end part 9 prevents deformations of the preferably loose sealing element 7, which could be caused, for example, by the radially mutually offset lines of action of the opening spring 6 and the closing spring 8. These deformations adversely affect the leaktightness of the valve. The taper of the closing spring 8 not only performs the closing function but at the same time also centers the actuating element 10 and thus also the sealing element 7 above the valve seat.

The opening spring 6 or the entire opening spring arrangement is, of course, weaker than the closing spring 8 or the entire closing spring arrangement, the difference between the forces of the closing and the opening spring advantageously being equal, in terms of quantity, to the difference between the forces of the electromagnet and spring arrangement.

In the present case, furthermore, there is no connection capable of being subjected to tension between the sealing element 7 and the actuating element 10, so that the opening spring 6 is absolutely essential to lift the sealing element 7 off from the sealing strip 3 and open the valve. In order then to ensure sufficient strength and also dimensional stability of the actuating element 10 and also of the widened end part 9, these parts are preferably made from metal. On the other hand, to keep the wear on the sealing strip 3 low, the sealing element 7 is to be made not from metal but from plastic. It is difficult, however, to produce a durable steel-plastic connection capable of being subjected to alternating stresses. It is of course advantageous for there to be at least assistance of the opening operation of the valve in other types of valves as well.

The actuating element 10 is preferably connected to the armature plate 12, made from magnetizable, relatively soft metal, with interposition of a stop plate 11, by way of the screw 13. The stop plate 11 is made from a non-magnetizable or only slightly magnetizable, but considerably harder material than the armature plate 12, preferably from precipitation-hardening chromium steel.

The closing spring 8 is supported on the side located opposite the end part 9 by way of two mutually convexly facing disc springs 14, 15, the disc spring 14 which is in contact with the closing spring 8 resting on a bent-off portion 16 of the inner wall of the valve body 1 and thus constituting a substantially stationary support for the closing spring 8. The second disc spring 15 is supported by way of an intermediate disc 17 against a spacer ring 18, which, in turn, bears against the side of the electromagnet 19 facing the armature plate 12.

The spacer ring 18, which surrounds the armature plate 12 and the stop plate 11, is made from a material with high dimensional stability and temperature resistance, for instance through minimal water absorption, preferably from a plastic material filled with a high level of mineral materials, carbon fibers or glass fibers. Particularly preferred plastic materials for this application are polyphenylsiloxanes (PPS), but also polyether ether ketones (PEEK), polyether imides (PEI) and polyphthalamides (PPA). The spacer ring 18, which also guides the armature plate 12 with low friction, has a bent-off portion 20 which is directed towards the stop plate 11 and against which the stop plate 11, projecting radially beyond the armature plate 12, comes into abutment when the armature plate 12 is in its position nearest the electromagnet 19. The thickness of the spacer ring 18 from the underside of the electromagnet 19 to the bent-off portion is, however, always greater than the thickness of the armature plate 12 in this arrangement, so that even when the valve is fully open a clearance remains between the armature plate 12 and the electromagnet 19. Even if there are high forces and rapid movements of the system consisting of the armature plate 12, the stop plate 11, the actuating element 10 and the end part 9, the hard material of the stop plate 11 prevents a deformation of the armature plate 12 and thus prevents the armature plate 12 from abutting against the very soft material of the electromagnet 19.

The electromagnet 19, preferably a coil magnet with a three-legged yoke and controlled by way of the electronics of the injection system, is supplied with current by way of the threaded connection pin 21, the current being fed in by way of the plug 22. The force exerted by the electromagnet 19 is in the range from 200 to 300 N in order to achieve the required short control times of less than 1 ms. So that the times for opening and closing the valve are substantially equal, the forces of the electromagnet 19, the closing spring 8 and opening spring 6 are coordinated with one another in such a way that the difference between the forces of the electromagnet 19 and the arrangement of the opening spring 6 and the closing spring 8 is equal, in terms of quantity, to the difference between the forces of closing spring 8 and opening spring 6, so that forces of equal size are required for the opening and closing and thus, indirectly, equal accelerations act on the sealing element 7.

Seals 23 on the outside of the valve housing ensure the leaktight installation of the gas valve in the system into which the fuel issuing from the valve or the issuing combustible mixture is injected by way of the fuel outlet 24.

By rotating the magnetic clamping nut 2, the distance between the electromagnet 19 fixedly held therein and the armature plate 12 can be adjusted, the armature plate 12 in the de-energized state of the electromagnet 19 normally being in its position with the greatest distance from the electromagnet 19, that is to say the closed position of the valve, owing to the action of the at least one closing spring 8 on the widened end part 9 of the actuating element 10. The valve lift and thus the directly proportional opening cross-section can thereby be precisely adjusted and calibrated. Typically, the valve lift will be in the range from about 0.15 to 0.3 mm and the opening cross-section in the range up to approximately 10 mm$^2$. The disc spring arrangement 14, 15 compensates for these changes in distance for the support position of the closing spring 8, so that the latter always substantially retains the same prestress and the valve characteristic therefore only changes insignificantly or not at all on adjustment of the valve lift.

Figure 2:
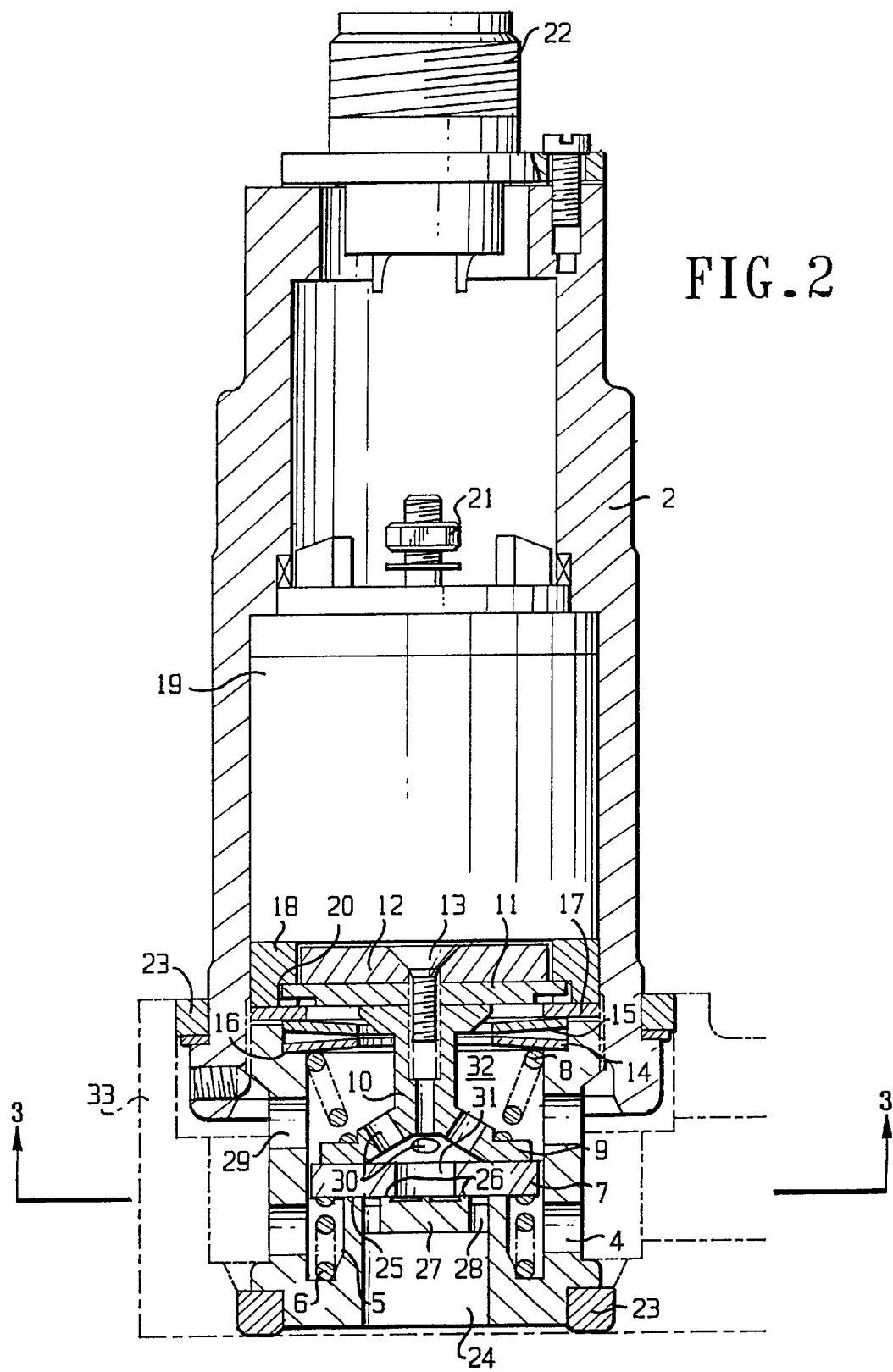
FIG. 2 shows a gas valve of larger valve cross-section with two sealing strips.

The embodiment of the gas valve in FIG. 2 differs from the embodiment in FIG. 1 in that there is a different design of the valve seat, which as a consequence also entails changes to the sealing element, the end piece of the actuating element and the fuel inlet. The rest of the construction does not differ from the one described above.

Figure 3:
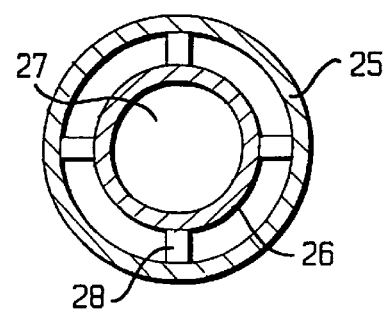
FIG. 3 is a section as seen along the line 3—3 of FIG. 2.

The valve seat of the gas valve in FIG. 2 includes two sealing strips 25, 26 which are both substantially plane and circular and are arranged in the same plane and substantially concentrically, preferably coaxially. The inner sealing strip 26 is formed on a disc 27 which is held on the part of the valve body 1 forming the outer sealing strip 25, by way of at least two, preferably three or more webs 28—see also FIG. 3 in this regard. In order not to affect the sealing action of the sealing element 7, the webs 28 do not reach the height of the sealing strips 25 and 26. To allow the fuel or the combustible mixture to flow through the valve by way of both sealing strips and thus through the overall higher valve cross-section, gas passages to the inner sealing strip 26 are also provided. In the exemplary embodiment illustrated, these gas passages are formed by at least one additional, preferably likewise radial fuel inlet 29, openings 30 in the widened end part 9 of the actuating element 10 and at least one central cutout 31 in the thereby preferably annular sealing elements 7. As an alternative to this, connecting channels or axial groove-shaped cutouts in the inner wall of the valve body 1 could also be provided to connect the annular space 5 to the space 32 lying above the sealing element 7.

By virtue of the presence of two sealing strips 25 and 26 of almost equal length, the valve cross-section of the gas valve illustrated in FIG. 2 is almost twice as large and is about 15 to 18 mm² while having the same control times as for the first embodiment described. Dashed lines indicate a gas distribution strip 33 into which the gas valve is inserted so as to be sealed by way of the seals 23 and in which it is fixed by a clamping plate (not illustrated) surrounding the magnetic clamping nut 2.

Figure 4:
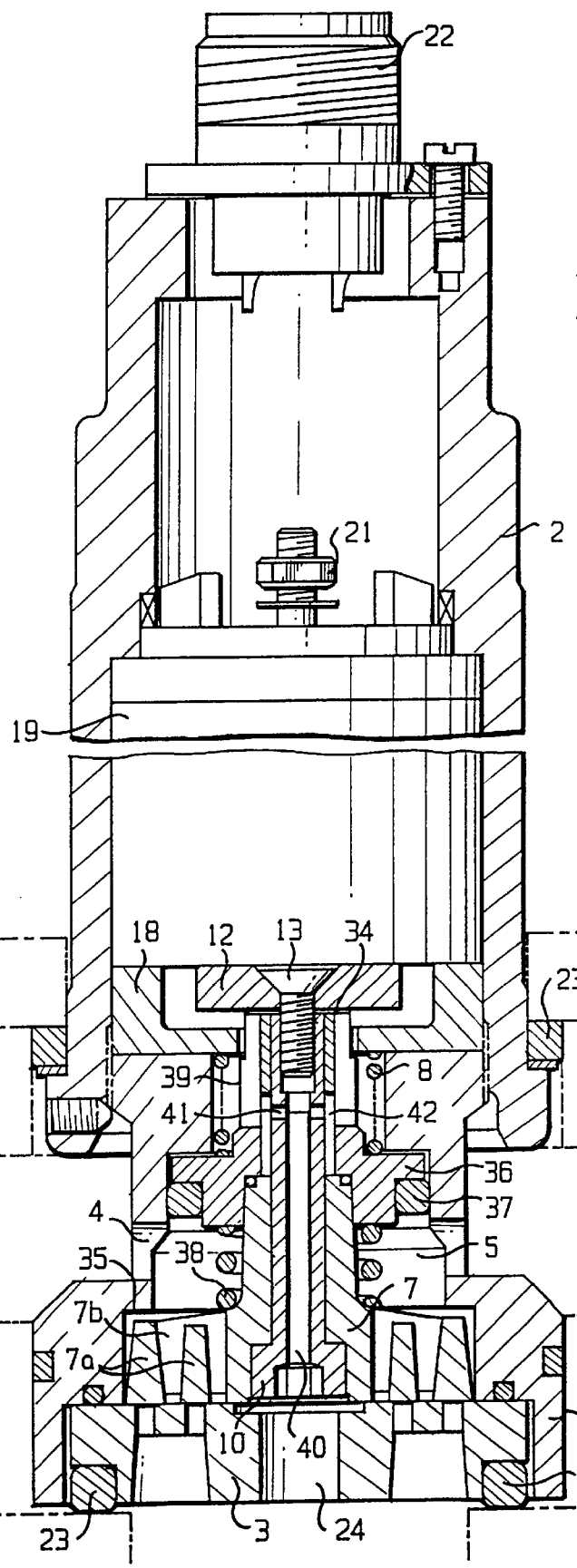
FIG. 4 shows a gas valve of large valve cross-section as a result of a plurality of concentric sealing strips and with a lightweight sealing element, according to a further embodiment of the invention.

A further embodiment of a gas valve according to the invention, of further-enlarged valve cross-section, is illustrated in FIG. 4. Its sealing element 7 is now preferably made by injection moulding from polymeric plastic, in particular from a plastic material filled, where possible isotropically, with a high level of mineral materials, carbon fibers or glass fibers, in order to keep the wear on the valve seat 3 and also the weight of the sealing element 7 low. Particularly preferred plastic materials for this application are again polyphenylsiloxanes (PPS), but also polyether ether ketones (PEEK), polyether imides (PEI) and polyphthalamides (PPA), on account of their high dimensional stability and temperature resistance.

The plurality of annular and concentric sealing strips of the valve seat 3 are overlapped by peripheral ridges 7a of the sealing element 7, between which peripheral ridges 7a cutouts are left free to allow the fuel gas to reach the greatest-possible region of the sealing strips. The number of peripheral ridges 7a is proportional to the number of sealing strips present, five sealing strips and two peripheral ridges 7a being present in the present case, since the innermost sealing strip is covered by the disc-shaped central region of the sealing element 7. In general, (n−1)/2 peripheral ridges are to be provided, where n denotes the number of sealing strips present.

Figure 5A:
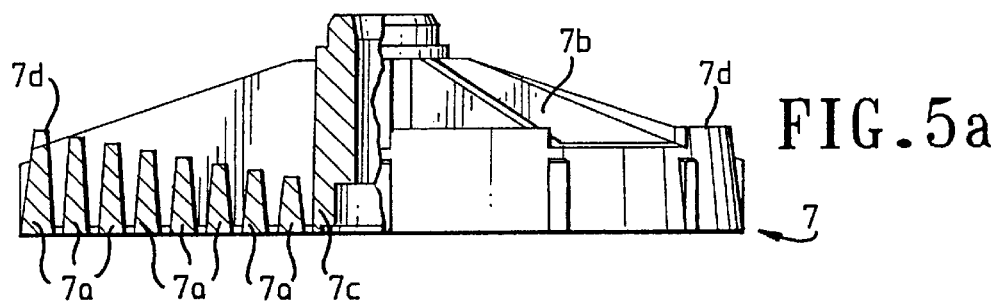
FIGS. 5a and 5b illustrate another embodiment of the sealing element on an enlarged scale.
Figure 5B:
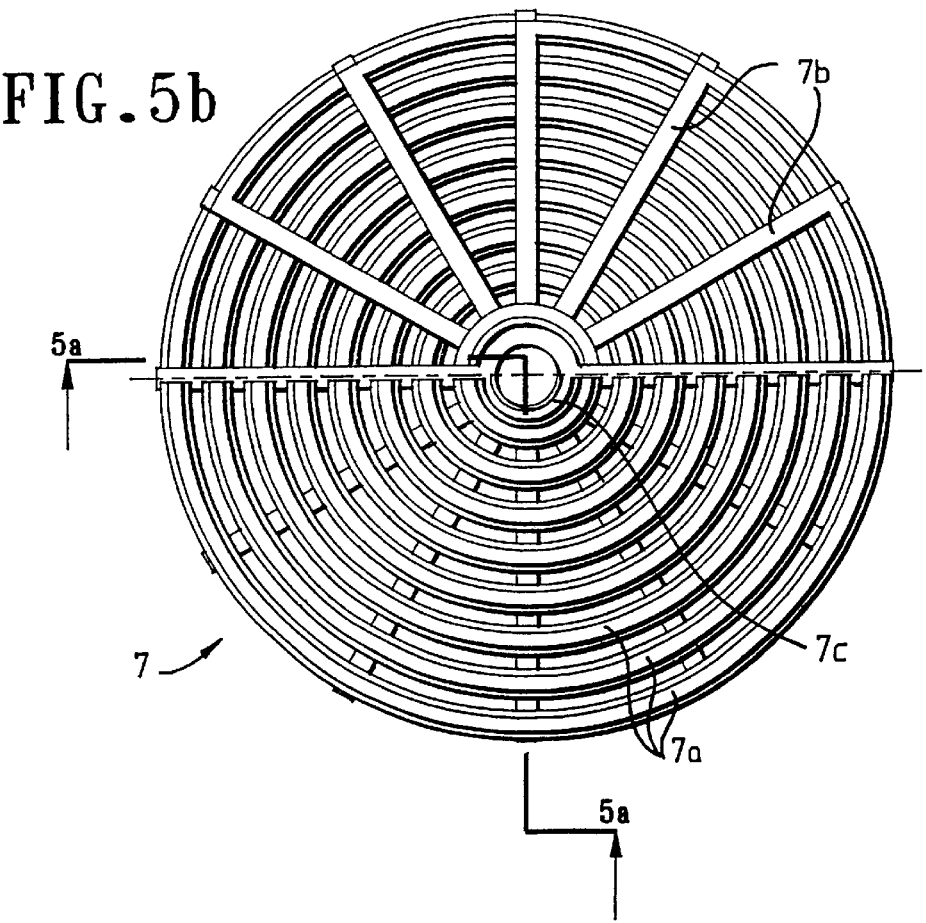

The connection of in each case one pair of peripheral ridges 7a, a group of peripheral ridges or all of the peripheral ridges and also the required mechanical strength of the sealing element 7 are then ensured by the radial walls 7b of the latter. The number of radial walls 7b is adaptable to a large extent to the strength and weight requirements, although it is advantageous for there to be between two and six radial walls 7b present. The radial walls 7b are preferably spaced apart from one another by equal angular amounts in each case (2 webs −180°, 3 webs 120°, etc.). The axial height of the peripheral ridges 7a, that is to say the "thickness" of the sealing element 7 also contributes to the required mechanical stability. FIG. 5a illustrates a partial cross-section (view along the line a—a of FIG. 5b) through a further embodiment of the sealing element 7 according to the invention, in which, in addition to the central sealing disc 7c, eight peripheral ridges 7a—for a maximum of 17 sealing strips—are present, their height increasing from the centre outwards. In contrast, the height of the radial walls 7b decreases outwards. As can be seen in FIG. 5b, which in the upper half shows a top view of the sealing element 7 and in the lower half shows a bottom view from the direction of the sealing strips, twelve radial walls 7b are present and each two thereof include an angle of 30° with one another. On the outermost peripheral ridge 7a there are provided stop regions 7d which are intended to limit the lift of the sealing element 7 against an oppositely located stop region on the housing or the like.

The actuating element 10 (see FIG. 4) is connected, with interposition, where appropriate, of spacer plates 34 for tolerance compensation, preferably by a screwed connection 13 to an armature plate 12 made from magnetizable, relatively soft metal arranged so as to be protected in a spacer element 18. The closing spring 8 is also supported on the underside of this spacer element 18, which in this case is designed as a bush.

The valve housing 1 has an inner bent-off portion 35 against which stop regions of the radial walls 7b extending furthest outwards of the sealing element 7 and/or stop regions 7d of the outermost peripheral ridges 7a come into abutment when the armature plate 12 is in its position nearest the electromagnet 19, preferably a pot magnet. The distance from the upper side of the stop regions of the sealing element 7 to the bent-off portion 35 determines the valve lift in this arrangement, preferably between 0.1 and 0.3 mm, and is preferably always less than the distance between the armature plate 12 and the underside of the electromagnet 19 in the closed state of the valve, so that even when the valve is fully open a clearance remains between the armature plate 12 and the electromagnet 19. Even if there are high forces and rapid movements of the system consisting of the armature plate 12, the actuating element 10 and the sealing element 7, an abutment of the armature plate 12 against the likewise very soft material of the electromagnet 19 is prevented in this way.

So that the times for opening and closing the valve are substantially equal and can also be adhered to with equal precision for all the pressures occurring in the system, there may advantageously be provision for a compensating piston 36 as a device for compensating for the differential pressure on the sealing element 7. Its area of pressure action corresponds to that of the sealing element 7, so that the differential pressure acting on the sealing element 7 is compensated for. For the opening of the valve, all that is necessary therefore is that the electromagnet 19 overcomes the force of the closing spring 8 and the mass inertia of the armature plate 12, the spacer plates 34, the actuating element 10 and the sealing element 7 itself. It is thus possible to employ small electromagnets 19 of low power consumption, even in valves of large opening cross-sections. The compensating piston 36 surrounds the actuating element 10 as a substantially disc-shaped component which is sealed with respect to the valve housing 1 guiding it by means of a peripheral sealing ring 37 and thus at the same time also guiding the actuating element 10 and the sealing element 7 so as to be centred in the valve housing 1. The closing spring 8 acts on the compensating piston 36 and thus indirectly also on the actuating element 10 and the sealing element 7. A compensating spring 38, prestressed between the sealing element 7 and the compensating piston 36, ensures that the compensating piston 36 always bears directly against the armature plate 12 or the spacer plates 34. Wear-promoting sliding of the compensating piston 36, which is likewise preferably made from plastics, is thus also avoided.

In order not to obstruct the closing action of the closing spring 8 by means of the pressure applied to the compensating piston 36, gas passages are provided from the fuel outlet 24 and/or outflow space into a compensating space 39 on the side of the compensating piston 36 located opposite this outflow space 24. In the present case, this is the side of the compensating piston 36 located opposite the sealing element 7. These gas passages, which serve for overflowing, are advantageously realized in the present case by a central bore 40 in the actuating element 10 with radial discharge openings 41 leading into the compensating space 39 and corresponding radial openings 42 in the bush-shaped part of the compensating piston 36. If the sealing element 7 does not have a central opening through which the actuating element 10 extends, it is of course also necessary to provide in the sealing element 7 at least one corresponding bore or a through-opening, which is preferably injection-moulded simultaneously therewith. After the opening of the valve, the pressure in the compensating space 39 follows the time course of the pressure in the fuel outlet 24 and the outflow space located downstream thereof with a time delay caused by the throttling in the relatively narrow gas passages. As a result, the direction of action of the force acting on the compensating piston 36 can be reversed at short notice. It is therefore advantageous to design these gas passages to be sufficiently large in order to keep the throttling as low as possible.

Seals 23 on the outside of the valve housing ensure the leaktight installation of the gas valve in, for example, a gas distribution strip 33 of the system, into which system the fuel issuing from the valve or the issuing combustible mixture is injected by way of the outflow opening 24. Preferably, the gas valve is fixed by a clamping plate (not illustrated) surrounding the magnetic clamping nut 2.

Figure 6:
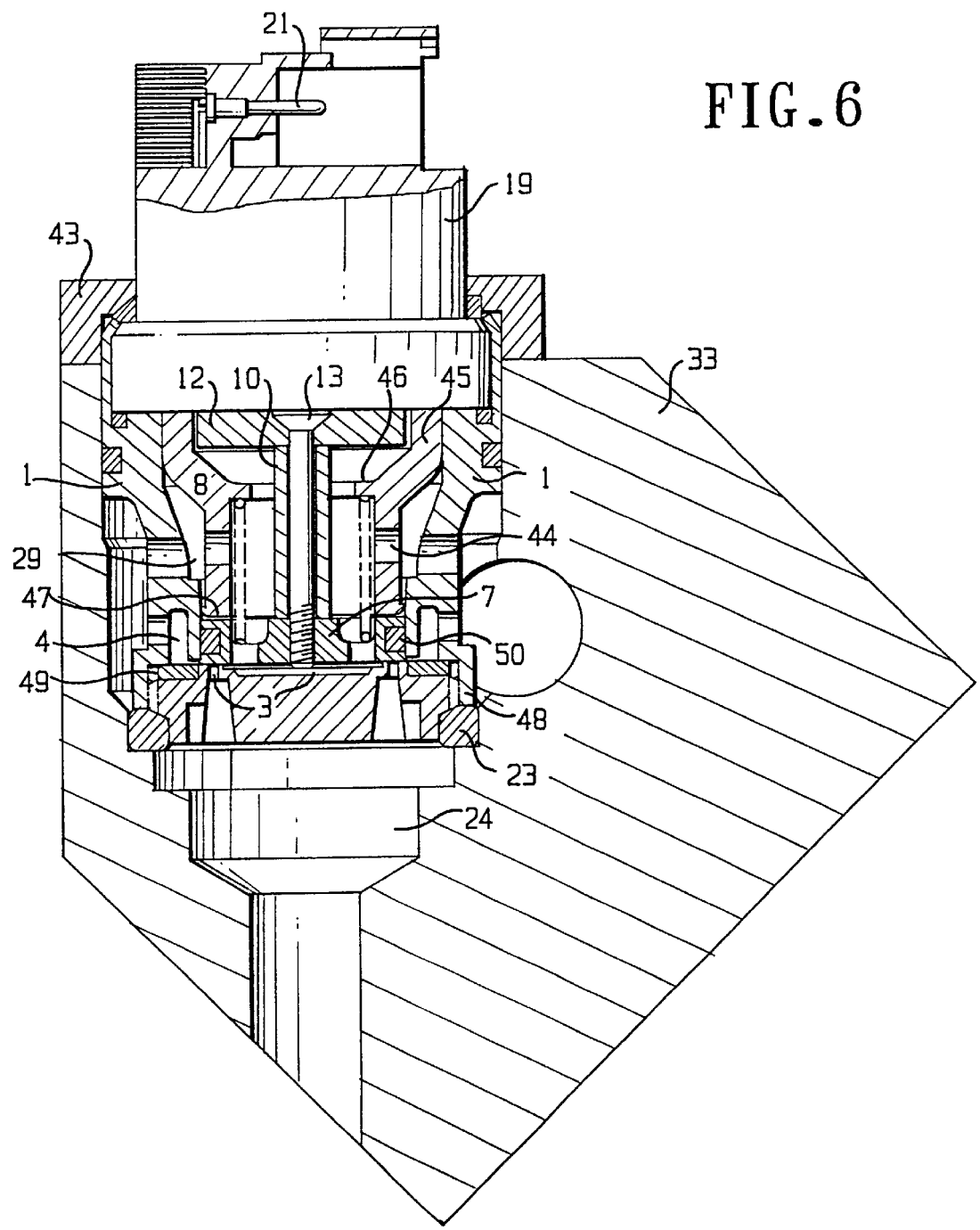
FIG. 6 is a longitudinal section through a further embodiment of a gas valve according to the invention.

A somewhat simplified embodiment is illustrated in longitudinal section in FIG. 6, with components which have already been described in the previous exemplary embodiments being indicated by the same reference symbols. The gas valve in FIG. 6 is fixed by means of the clamping plate 43 in the gas distribution strip 33. The electromagnet 19 is fixed and captively held with respect to the valve housing 1 by inwardly directed offset portions of the latter. Radial fuel inlets 4, 29 to the preferably concentrically circular sealing strips in the valve seat 3 which are covered by the sealing element 7, are preferably present in the valve housing 1. Fuel passages 44 substantially aligned with the upper fuel inlets 29 are provided in an inner stop ring 45 to allow the fuel access to the innermost sealing strips. The closing spring 8 is clamped between an inner, annular projection 46 of this stop ring 45 and the sealing element 7, so that the stop ring 45 is pressed against the underside of the electromagnet 19 and the sealing element 7 is pressed onto the valve seat 3.

A plane stop face 47, against which the upper side of the sealing element 7 finally comes into abutment when it is lifted off from the valve seat 3 by the electromagnet 19 through attraction of the armature plate 12 and the actuating element 10 connected to this armature plate 12 by the screwed connection 13, is preferably formed on the lower end of the stop ring 45. The height of the stop ring 45 is advantageously dimensioned in this arrangement such that when the valve is fully open, that is to say when the sealing element 7 rests on the stop face 47, a small distance still remains between the armature plate 12 and the underside of the electromagnet 19. Damage to the relatively soft armature plate 12 and the electromagnet 19 can thus be avoided.

In order to obtain the adjustability of the lift of the sealing element 7 and thus of the opening cross-section of the valve, the valve housing 1 is designed as an adjusting element with an internal thread 48 at the lower end. This internal thread 48 engages in a corresponding external thread on the outer periphery of the valve seat 3 and permits an axial height adjustment by way of a relative rotation of these two parts with respect to one another, that is to say the valve seat 3 can be axially adjusted with respect to the underside of the electromagnet 19, which is fixed with respect to the valve housing 1. Undesired rotation and thus fixing after the distance has been adjusted is prevented by way of the stressing by means of the disc spring 49. The closing spring 8 continues to press the sealing element 7 onto the valve seat 3 and the stop ring 45 against the underside of the electromagnet 19, so that the axial adjustment of the valve housing 1 and valve seat 3 is also passed on to the distance between the stop face 47 and the oppositely located upper side of the sealing element 7, and in this way accordingly increases or reduces the possible lift of the sealing element 7, which is preferably guided in the valve housing by way of seals and sliding rings 50.

What is claimed is:

1. A gas valve with electromagnetic actuation comprising
at least one fuel inlet,
at least one fuel outlet,
at least one sealing strip in the form of a closed curve, substantially circular,
a sealing element actuable by way of an armature of a controllable electromagnet and arranged between the or each fuel inlet and the or each fuel outlet, and
at least one closing spring acting on the sealing element, wherein the sealing element has a number, proportional to the number of sealing strips, of peripheral ridges which follow the course of the sealing strips and of which at least two in each case are interconnected by at least one radial wall and
wherein the gas valve is designed as a flat-seat valve with a plane valve seat and a sealing element with at least one plane sealing surface facing this valve seat.

2. A gas valve according to claim 1, wherein the fuel inlet opens radially into an annular space surrounding the valve seat below the sealing element.

3. A gas valve according to claim 1, wherein at least one radial wall radiates from the center of the sealing element and interconnects all the peripheral ridges.

4. A gas valve according to claim 1, wherein the axial height of at least one radial wall decreases from the center towards the edge of the sealing element.

5. A gas valve according to claim 4, wherein the sealing element has a central bore for receiving an actuating element.

6. A gas valve according to claim 5, wherein the central bore is axially extended in the manner of a bush.

7. A gas valve according to claim 6, wherein the sealing element is an injection-moulded part made of plastic.

8. A gas valve according to claim 7, wherein the sealing element is an injection-moulded part made of a polymer.

9. A gas valve according to claim 1, wherein the valve seat is formed by at least two concentric sealing strips which define an annular space cross-section which is covered by an annular sealing element, and in that gas passages are provided to both sealing strips, the gas passages to the outer sealing strip being formed by the or each fuel inlet and the annular space, and the gas passages to the inner sealing strip being formed by at least one radial fuel inlet, cutouts in an actuating element, and a central cutout of the annular sealing element.

10. A gas valve according to claim 9, wherein the armature acts on the sealing element by way of the actuating element.

11. A gas valve according to claim 10, wherein at least the one closing spring acts on the actuating element.

12. A gas valve according to claim 11, wherein the at least one closing spring acts on a widened end piece of the actuating element provided for bearing on the sealing element.

13. A gas valve according to claim 12, wherein the at least one closing spring urges the sealing element or the actuating element with a centering force, radially in the direction of the center axis of an outlet opening.

14. A gas valve according to claim 13, wherein a helical spring surrounding the actuating element is provided as the closing spring, the helical spring tapering towards the sealing element or towards the actuating element.

15. A gas valve according to claim 14, wherein the actuating element and the sealing element are separate, unconnected parts and at least one opening spring which urges the sealing element in the opening direction is provided.

16. A gas valve according to claim 15, wherein the difference between the forces of the closing spring and the opening spring arrangement is substantially equal, in quantity, to the difference between the forces of the electromagnet and the resultant force of the spring arrangement.

17. A sealing element for gas valve, comprising
- at least two concentric peripheral ridges following the course of at least one sealing strip of a gas valve, and
- at least two of said concentric peripheral ridges are interconnected by and held spaced apart by at least one radial wall.

18. A sealing element according to claim 17, wherein at least one radial wall radiates from the center of the sealing element and interconnects all the peripheral ridges.

19. A sealing element according to claim 17, wherein the axial height of at least one radial wall decreases from the center towards the edge of the sealing element.

20. A sealing element according to claim 19, wherein the sealing element has a central bore for receiving an actuating element.

21. A sealing element according to claim 20, wherein the central bore is axially extended in the manner of a bush.

22. A sealing element according to claim 21, wherein the sealing element is an injection-moulded part made of plastic.

23. A sealing element according to claim 22, wherein the sealing element is an injection-moulded part made of a polymer.

24. A gas valve with electromagnetic actuation comprising
- at least one fuel inlet,
- at least one fuel outlet,
- a sealing element actuable by way of an armature of a controllable electromagnet and arranged between the or each fuel inlet and the or each fuel outlet, said sealing element having
  - at least two concentric peripheral ridges following the course of at least one sealing strip of a gas valve, and
  - at least two of said concentric peripheral ridges are interconnected by and held spaced apart by at least one radial wall, and
- at least one closing spring acting on the sealing element,
- wherein the gas valve is designed as a flat-seat valve with a plane valve seat and a sealing element with at least one plane sealing surface facing the valve seat.

25. A gas valve according to claim 24, wherein the fuel inlet opens radially into an annular space surrounding the valve seat below the sealing element.

26. A gas valve according to claim 24, wherein at least one radial wall radiates from the center of the sealing element and interconnects all the peripheral ridges.

27. A gas valve according to claim 24, wherein the axial height of at least one radial wall decreases from the center towards the edge of the sealing element.

28. A gas valve according to claim 27, wherein the sealing element has a central bore for receiving an actuating element.

29. A gas valve according to claim 28, wherein the central bore is axially extended in the manner of a bush.

30. A gas valve according to claim 29, wherein the sealing element is an injection-moulded part made of plastic.

31. A gas valve according to claim 30, wherein the sealing element is an injection-moulded part made of a polymer.

32. A gas valve according to claim 24, wherein
- the valve seat is formed by at least two of the sealing strips which define an annular space cross-section and which is covered by an annular sealing element, and gas passages are provided to both sealing strips,
  - the gas passages to the outer sealing strip being formed by the or each fuel inlet and the annular space, and
  - the gas passages to the inner sealing strip being formed by at least one radial fuel inlet, cutouts in an actuating element, and a central cutout of the annular sealing element.

33. A gas valve according to claim 32, wherein the armature acts on the sealing element by way of the actuating element.

34. A gas valve according to claim 33, wherein at least the one closing spring acts on the actuating element.

35. A gas valve according to claim 34, wherein the at least one closing spring acts on a widened end piece of the actuating element provided for bearing on the sealing element.

36. A gas valve according to claim 35, wherein the at least one closing spring urges the sealing element or the actuating element with a centering force, radially in the direction of the center axis of an outlet opening.

37. A gas valve according to claim 36, wherein a helical spring surrounding the actuating element is provided as the closing spring, the helical spring tapering towards the sealing element or towards the actuating element.

38. A gas valve according to claim 37, wherein the actuating element and the sealing element are separate, unconnected parts and at least one opening spring which urges the sealing element in the opening direction is provided.

39. A gas valve according to claim 38, wherein the difference between the forces of the closing spring and the opening spring arrangement is substantially equal, in quantity, to the difference between the forces of the electromagnet and the resultant force of the spring arrangement.

* * * * *